United States Patent [19]
Keirsey et al.

[11] Patent Number: 5,224,344
[45] Date of Patent: Jul. 6, 1993

[54] VARIABLE-CYCLE STORABLE REACTANTS ENGINE

[75] Inventors: James L. Keirsey, Frederick; Don H. Sheppard, Ellicott City, both of Md.

[73] Assignee: The United States of America as represented by the Secretary of the Navy, Washington, D.C.

[21] Appl. No.: 941,013

[22] Filed: Sep. 4, 1992

[51] Int. Cl.$^5$ ............................................. F02K 9/28
[52] U.S. Cl. ....................................... 60/244; 60/257; 60/270.1
[58] Field of Search .................. 60/270.1, 39.12, 224, 60/240, 241, 244, 246, 257

[56] References Cited

U.S. PATENT DOCUMENTS

| | | | |
|---|---|---|---|
| 2,686,473 | 8/1954 | Vogel | 60/270.1 |
| 2,735,263 | 2/1956 | Charshafian | 60/270.1 |
| 2,861,420 | 11/1958 | Lewis | 60/270.1 |
| 2,948,112 | 8/1960 | Smith | 60/240 |
| 3,038,408 | 6/1962 | Kluge | 60/244 |
| 3,049,883 | 8/1962 | Sloan | 60/270.1 |
| 4,342,193 | 8/1982 | Thatcher | 60/246 |
| 4,562,699 | 1/1986 | Rowe et al. | 60/270.1 |

OTHER PUBLICATIONS

"A Concentric Tank Rocket." Astronautics (Oct., 1933): pp. 2-3.
Keirsey, James L., Airbreathing Propulsion for Defense of the Surface Fleet, John Hopkins APL Tech Digest, vol. 13, No. 1 (1992) pp. 57-68.

*Primary Examiner*—Richard A. Bertsch
*Assistant Examiner*—Timothy S. Thorpe
*Attorney, Agent, or Firm*—John D. Lewis; Jacob Shuster

[57] ABSTRACT

A variable-cycle storable fuels engine having three cycles is provided. The engine operates as an air-augmented rocket from launch to approximately Mach 3. From approximately Mach 3 to Mach 8, the engine operates as a dual mode ramjet/scramjet to altitudes exceeding 100,000 feet. Thereafter, the engine operates as a conventional pure rocket for final sub-orbital boost. A fixed geometry air inlet provides improved ram recovery at altitudes below 100,000 feet.

6 Claims, 5 Drawing Sheets

5,224,344

VARIABLE-CYCLE STORABLE REACTANTS ENGINE

ORIGIN OF THE INVENTION

The invention described herein was made by James L. Keirsey and Don H. Sheppard in the performance of official duties as employees of the Applied Physics Laboratory of John Hopkins University under Contract No. N00039-87-C-5301 to the Department of the Navy and may be manufactured, used, licensed by or for the Government for any governmental purpose without payment of any royalties thereon.

FIELD OF THE INVENTION

The invention relates to variable-cycle jet and rocket engine and more particularly to a fixed geometry, variable-cycle engines using storable reactants (fuel and oxidizer).

BACKGROUND OF THE INVENTION

The use of rocket engines to accelerate ramjet-powered vehicles is well known. In addition to detachable rocket boosters, the prior art includes integral rocket-ramjet configurations typically formed by a tandem arrangement of the ramjet-rocket engines wherein the rocket engine provides the initial acceleration and the ramjet provides the cruise power.

After the acceleration phase, the rocket engine is jettisoned. Another variation provides the rocket grain within the ramjet combustor typically jettisoning only the rocket nozzle. Despite the weight and space savings, limitations remain. Various inlet opening and closing mechanisms are required in addition to the exhaust nozzle mechanism and jettisoning hardware. A more complete background of the development field, incorporated herein by reference is included in John Hopkins Applied Physics Laboratory Technical Digest, Volume 13, Number 1 (1992), and covers generally six areas:

1. Talos: A liquid-fueled ramjet missile that recorded a total of 1,349 flights, of which 750 successive flights were without a ramjet engine failure. Later, as a supersonic target (Vandal), 320 missiles were flown with a success record of 98%.
2. Typhon Long-Range (LR): A smaller, higher-speed, liquid-fueled ramjet similar in design to Talos that had eight successful ramjet flight demonstrations without an engine failure.
3. Augmented Thrust Propulsion (ATP): A ducted rocket using a boron-based solid fuel.
4. Supersonic Combustion Ramjet Missile (SCRAM): A hypersonic vehicle design based on the use of liquid borane high-energy fuels (HEF).
5. Dual-Combustor Ramjet (DCR): A hypersonic vehicle design using a hybrid ramjet/scramjet engine that operates with liquid hydrocarbon fuels, which are more logistically acceptable that HEF.
6. Advanced Surface-to-Air Ramjet (ASAR): An integral-rocket ramjet that uses the empty solid-rocket booster chamber as a dump-type ramjet combustion chamber and uses liquid hydrocarbon fuels.

All of the above provide a general background, however the specific background area for the present invention is the combination of Nos. 3 and 5, Augmented Thrust Propulsion and the Dual-Combustor Ramjet.

SUMMARY OF THE INVENTION

An object of the present invention is to provide an improved propulsion system having a capability to provide boost and sustain thrust efficiently over a broad Mach number spectrum from static conditions at launch to hypersonic speeds at extreme altitudes (above 100,000 ft.). The propulsion system is a fixed geometry, variable cycle engine which operates either as an air-augmented rocket, a gas-generator fed ramjet/scramjet, or a pure rocket as is appropriate in various regions of the altitude and speed spectrum.

It is a further object of the invention to provide a storable-reactants engine.

It is yet another object of the invention to provide a metal slurry-fueled variable cycle rocket/ramjet/scramjet engine.

The invention is a rocket/ramjet/scramjet variable-cycle engine using both a storable fuel and oxidizer thereby allowing adjustment of the fuel-oxidizer mixture over a range necessary to accommodate the various cycles. The rocket motor chamber is located co-axially inside the ramjet duct forming the nose cone and inlet section. The sequence of operating cycles is as follows: (1) static and low Mach/low altitude operation as an air-augmented rocket, (2) mid-altitude operation from supersonic to hypersonic flight as a ramjet/scramjet, and (3) high altitude operation as a pure rocket. Smooth transition is achieved from one cycle mode to another by varying only the fuel-oxidizer mixture to produce the required combustor conditions. No moving inlet or exhaust nozzle geometry is required.

BRIEF DESCRIPTION OF THE DRAWINGS

The foregoing objects and other advantages of the invention will be better understood from the following description taken with the accompanying drawings wherein like reference numerals refer to the same element throughout and wherein.

DETAILED DESCRIPTION OF THE INVENTION

Figure 1:
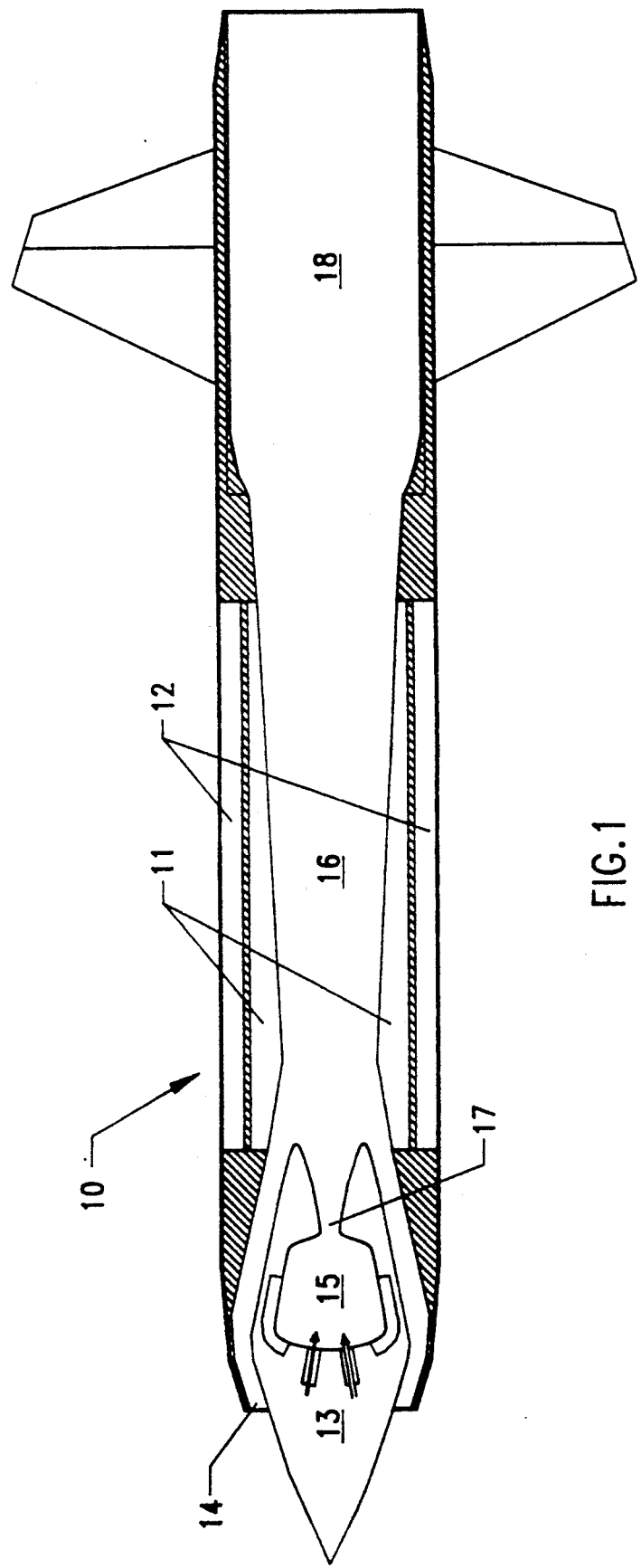
FIG. 1 is a cross-sectional view of the variable-cycle engine.

Referring now to FIG. 1, the variable-cycle engine, designated generally by the reference numeral 10, is shown with its major components. Conventional annular fuel tanks 11 are located around the ram combustor chamber 16. Annular oxidizer tanks 12 are located around the annular fuel tanks 11. Conventionally-known plumbing and turbomachinery (not shown) supply fuel and oxidizer to the rocket chamber 15. The rocket chamber 15 is located in the air inlet innerbody section 13 which provides a fixed inlet allowing necessary shock control for air inlet 14. Rocket chamber 15 has a convergent-divergent nozzle 17 to provide supersonic rocket exhaust velocities into ram combustor chamber 16. Ram combustor chamber 16 is formed with an increasing diameter to accommodate increasing downstream temperatures of the flow. A ram exhaust nozzle 18 designed for high speed and high altitude operation is attached to the exhaust end of ram combustor chamber 16. Fuel to be used in the variable-cycle engine is either a conventional storable heavy hydrocarbon or an advanced fuel, such as a boron/hydrocarbon slurry. The oxidizer is a microencapsulated form of ammonium perchlorate suitable for pumping and injecting. Alternate fuels and oxidizers may be used, however the invention is specifically designed to provide for the chemical breakdown of complex hydrocarbon molecules into elemental superheated gases, these gases having constituents such as $H_2$, CO, $CH_4$ (methane), and $C_2H_6$ (ethane). In the preferred embodiment, the nominal inside diameter of the ram combustor chamber 16 is approximately ten inches.

Figure 2:
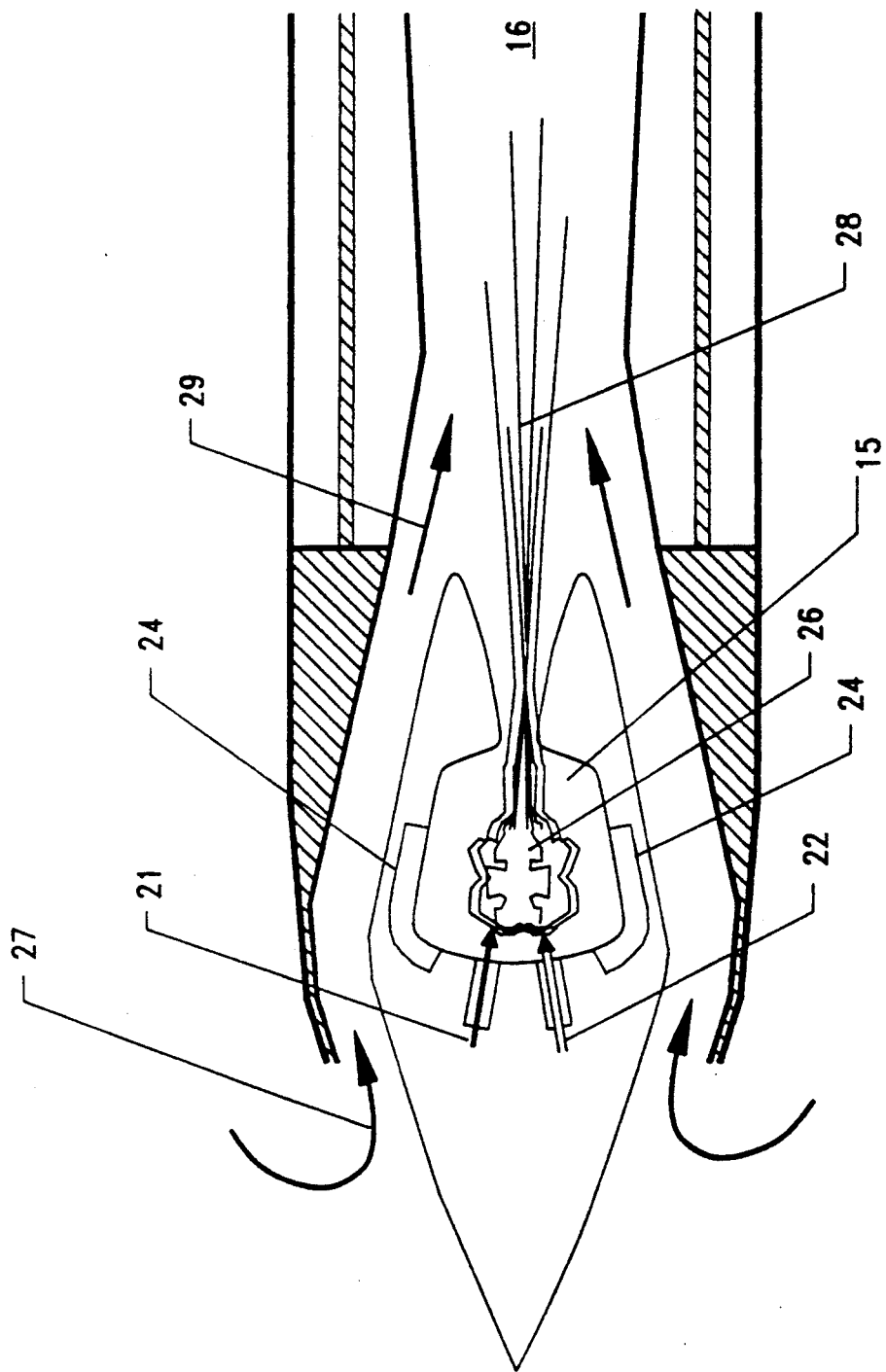
FIG. 2 is a partial cross-section depicting the launch phase using rocket thrust alone.

Referring now to FIG. 2, a partial section shows the operation of the variable-cycle engine during a static launch phase as a rocket with only slight ingestion of air 27 by ejector pumping action of the rocket jet which entrains airflow 29. Rocket chamber 15 receives injected fuel 21 and injected oxidizer 22 using conventional means (not shown). Additional fuel injectors 24 are located along the sides of the rocket chamber 15. A stoichiometric mixture 26 provides conventional rocket operation with the acceleration of the exhaust through the convergent-divergent nozzle. A supersonic exhaust plume 28 extends into ram combustor chamber 16. As velocity begins to increase after launch, the ram effect greatly increases the flow of air through the air inlet.

Figure 3:
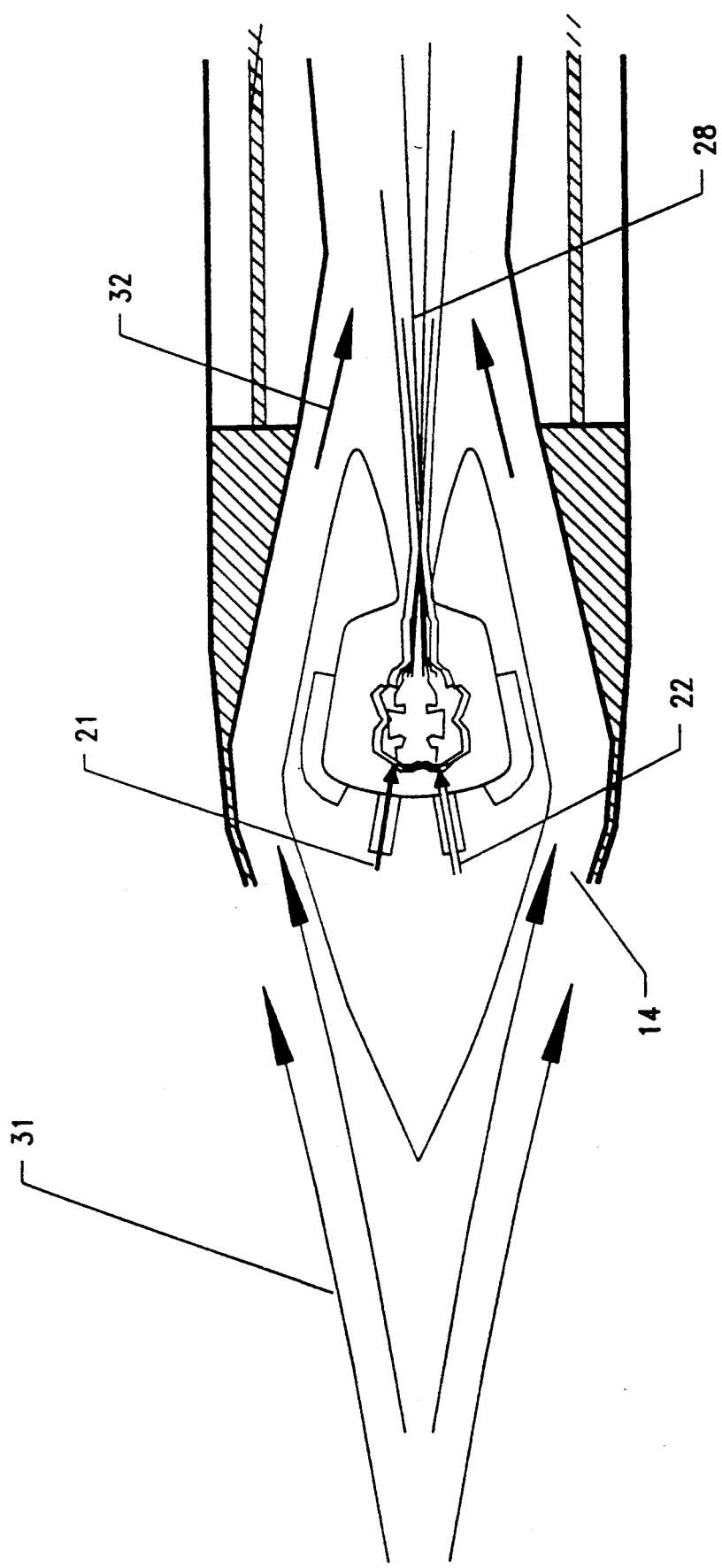
FIG. 3 is a partial cross-section depicting the acceleration phase of the variable-cycle engine.

Referring now to FIG. 3, operation of the engine is shown during the acceleration phase. Fuel 21 and oxidizer 22 continue to be injected in the rocket chamber. As velocity increases however, ram air flow 31 enters through air inlet 14 and is further entrained by the exhaust plume 28, thereby increasing the mass flow within the engine as depicted by augmented air streamline 32. In this acceleration phase, the rocket is operated fuel rich and the engine is operating as an air-augmented rocket. Mixing of the hot rocket fuel exhaust jet with the air produces further combustion downstream in the ram combustor chamber which augments the rocket thrust.

Figure 4:
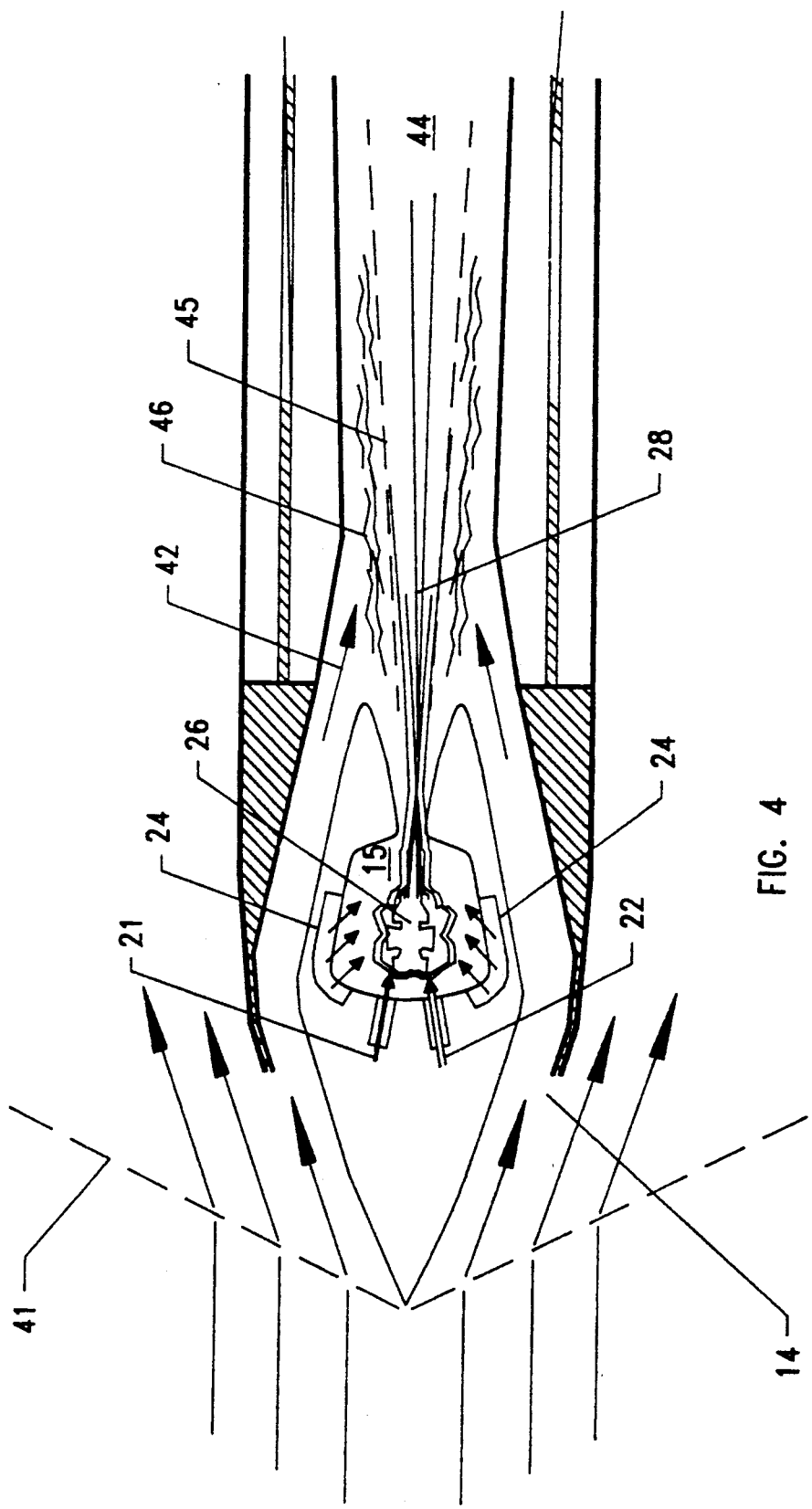
FIG. 4 is a partial cross-section depicting the cruise phase of the variable-cycle engine.

Referring now to FIG. 4, the second engine cycle is shown. In this second cycle, the engine is operating as a dual-mode ramjet/scramjet. For further description of the dual-mode ramjet/scramjet, refer to the Dual Combustor Ramjet engine in the previous "Background" section. As in the preceding cycle, fuel 21 and oxidizer 22 are injected into rocket chamber 15. A region containing a stoichiometric mixture 26 remains as the hot core of combustion for piloting, and additional fuel injectors 24 add excess fuel to create a fuel-rich region within the rocket chamber 15. Using a hydrocarbon fuel as an example, combustion within the rocket chamber resulting from the stoichiometric burning pilot core results in heating and breakdown of the complex hydrocarbon fuel chain. As a result, elemental and simple components such as $H_2$, $C_0$, $CH_4$ and $C_2H_6$ are formed. These gases cannot oxidize however in the small gas generator chamber because of the lack of available oxidizer. Instead, the fuel-rich mixture is injected into the ram combustor chamber, the gas volume having a hot burning core with a cylinder of unburned air surrounding the core. At this stage, mixing begins with inlet air 42 which has been captured by inlet 14 after a conventional multi-shock compression process, shown here as a single shock 41 for clarity. Flow in the ram combustor chamber mixes and burns from the hot core radially outward as the flow continues through the chamber. In a dual-mode ramjet/scramjet, the airflow entering the combustion chamber 16 may be either subsonic or supersonic. For ramjet operation typical of flight Mach numbers below approximately Mach 5, it will be subsonic. For scramjet operation, typical of flight Mach numbers from Mach 5 to 8, it will be supersonic. In a typical embodiment having a nominal ten-inch diameter ram combustor chamber, completed combustion of the mix occurs by approximately ten diameters downstream. The outward burning process is illustrated as burned region 44 expanding with downstream movement, having boundaries represented by flame front 45, and unburned region 46, unburned region 46 contracting with downstream movement.

Figure 5:
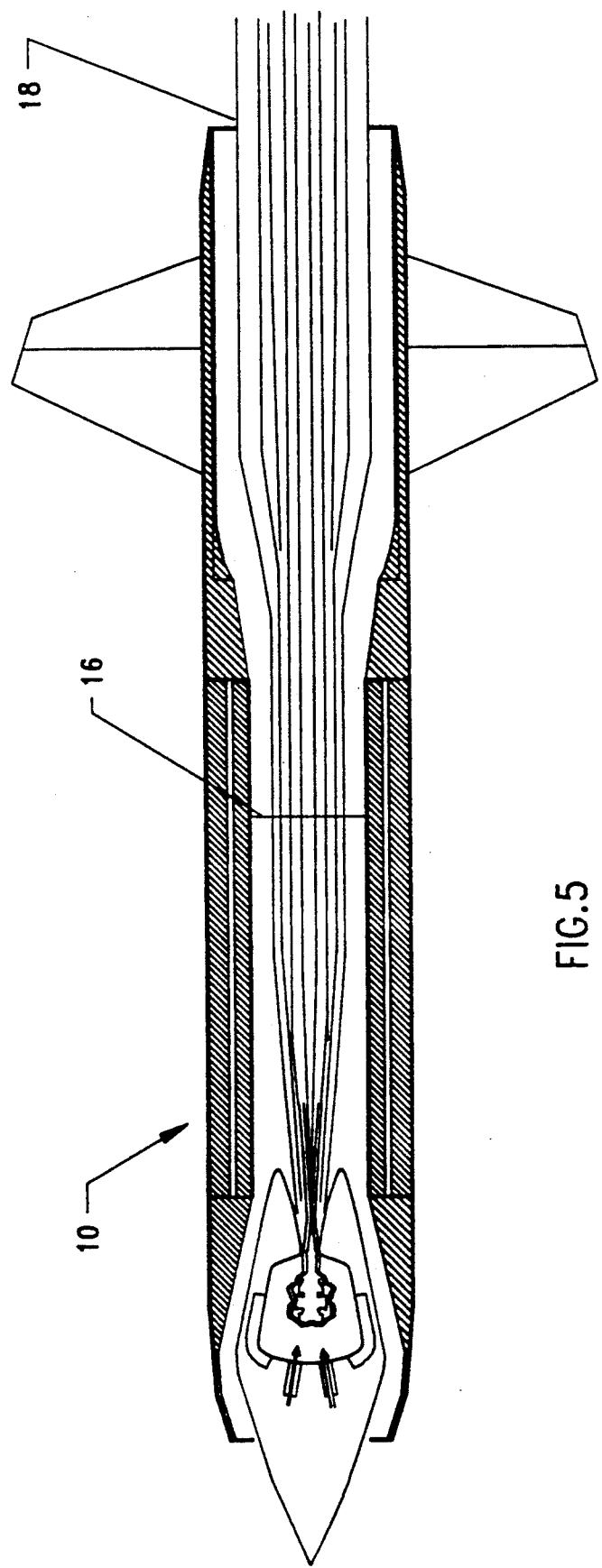
FIG. 5 is a partial cross-section depicting the high-altitude phase of the variable-cycle engine.

FIG. 5 depicts operation of the variable-cycle engine 10 at high altitudes above 100,000 feet using pure rocket power alone due to the lack of atmospheric oxygen at these altitudes. The expanding diameter of ram combustor chamber 16 and ram exhaust nozzle 18 are now used to form an extended nozzle for the rocket during high altitude, low nozzle exit pressure conditions.

The advantages of the invention are numerous. The combination ramjet-rocket cycles provide the ability to launch from zero velocity and thereafter use the increasing flow of ducted air, first for entrained air augmentation in the rocket cycle and then as a pure ramjet/scramjet once sufficient velocity has been achieved. The rocket chamber during the ramjet cycle serves as a gas generator producing a high velocity, high pressure stream of extremely hot gasses formed around an ignited core.

This gas core avoids ignition and blow out problems and at the same time allows use of complex hydrocarbon fuels. The use of complex hydrocarbon fuels is possible in the supersonic ram combustor section because the gas generator operation breaks these fuels into simple compounds or elemental gases, thereby increasing the available mixing and burn rates. The result is a system which can be stored long term without cryogenics and which can be launched quickly to provide low orbit and sub-orbital targeting using a relatively small missile.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A variable-cycle engine comprising:
   a main body assembly having a supersonic burning ram combustor chamber, with fuel and oxidizer tanks formed circumferentially around the ram combustor chamber, and with an inlet section and exhaust nozzle section;
   an inlet spike assembly attached to said main body assembly and located in the inlet section of the main body;
   a combination rocket engine having a throat and gas generator having an additional fuel injector inside the rocket engine near the throat located within said inlet spike assembly and discharging an unburned fuel-rich gas in its exhaust through the downstream end of said inlet spike assembly into the ram combustor chamber; and reactant and ignition systems connected to the fuel and oxidizer tanks for delivering to and igniting reactants in the rocket engine chamber.

2. A variable-cycle engine comprising:

a main body assembly comprising a supersonic burning ramjet combustor, fuel and oxidizer tanks and delivery systems, and an exhaust nozzle section;

a rocket engine suitable for use with conventional hydrocarbon or metal slurry-based reactants attached to said main body assembly;

means for generating unburned elemental and simple component gases from the fuel and oxidizer reactants attached to said rocket engine and generating the unburned gases within said rocket engine;

means for providing engine cycle transition reversibly from rocket to ramjet attached to said rocket motor; and means, attached to said main body, for providing external air to the ramjet combustor.

3. A variable-cycle engine as in claim 2 wherein said means for generating unburned elemental and simple component gases comprises a plurality of fuel manifolds and injectors attached to said rocket engine.

4. A variable-cycle engine as in claim 2 wherein said means for generating unburned elemental and simple component gases comprises a rocket chamber having a stoichiometric burning region and a fuel-rich region.

5. A variable-cycle engine as in claim 4 wherein the fuel-rich region has a high temperature sufficient to break down particular complex hydrocarbon reactants used as fuels and oxidizers and gasify other types of fuels including metallic slurries.

6. A variable-cycle engine as in claim 2 wherein said means for providing comprises a reactants injector system whereby the mixture within said rocket engine is variably adjusted to provide a stoichiometric burning region and to provide a fuel rich region having variable amounts of fuel added.

* * * * *